United States Patent [19]

Menon

[11] Patent Number: 5,506,979
[45] Date of Patent: Apr. 9, 1996

[54] METHOD AND MEANS FOR EXECUTION OF COMMANDS ACCESSING VARIABLE LENGTH RECORDS STORED ON FIXED BLOCK FORMATTED DASDS OF AN N+2 DASD SYNCHRONOUS ARRAY

[75] Inventor: Jaishankar M. Menon, San Jose, Calif.

[73] Assignee: International Business Machines Corporation, Armonk, N.Y.

[21] Appl. No.: 679,455

[22] Filed: Apr. 2, 1991

[51] Int. Cl.⁶ .................................................. G06F 12/00
[52] U.S. Cl. ................................... 395/439; 364/DIG. 1; 364/DIG. 2; 364/952; 364/952.1; 364/248.1
[58] Field of Search .................................. 371/11.1, 40.2; 395/575, 500, 439

[56] References Cited

U.S. PATENT DOCUMENTS

| | | | |
|---|---|---|---|
| 4,092,732 | 5/1978 | Ouchi | 395/575 |
| 4,223,390 | 9/1980 | Bowers et al. | 364/900 |
| 4,603,380 | 7/1986 | Easten et al. | 395/425 |
| 4,761,785 | 8/1988 | Clark et al. | 371/51 |
| 4,870,643 | 9/1989 | Bultman et al. | 371/11.1 |
| 4,914,656 | 4/1990 | Dunphy et al. | 371/10.2 |
| 4,989,206 | 1/1991 | Dunphy, Jr. et al. | 371/10.1 |
| 5,072,378 | 12/1991 | Manka | 395/575 |
| 5,077,736 | 12/1991 | Dunphy, Jr. et al. | 371/10.1 |
| 5,140,592 | 8/1992 | Idleman et al. | 371/8.1 |
| 5,148,432 | 9/1992 | Gordon et al. | 371/10.1 |
| 5,185,746 | 2/1993 | Tanaka et al. | 371/40.1 |
| 5,208,813 | 5/1993 | Stalmo | 371/10.1 |

OTHER PUBLICATIONS

Co-Pending Application, Bond et al., U.S. Ser. No. 07/542,216, filed Jun. 21, 1990 "Method and Apparatus for Recovering Parity Protected Data" (IBM Ref. #RO9-89-029).

"A Case For Redundant Arrays of Inexpensive Disk (RAID) Report #UCB/CSD 87/391", Dec., 1987, Computer Science Division Univ. of CA. of Berkeley.

Co-Pending Application, Matson et al., U.S. Ser. No. 07/562,188 filed Aug. 3, 1990 "Method and Means for Managing DASD Array Access When Operating in Degraded Mode" (IBM Ref. #SA9-90-020).

"Providing Fault Tolerance in Parallel Secondary Storage Systems", Princeton University Report CS-TR-057-86, Nov., 1986.

Menon Co-Pending U.S. Ser. No. 07/197,057 filed May 20, 1988 (SA9-87-036) "Emulating One Record Format on Another Record Format".

Menon Co-Pending U.S. Ser. No. 07/666,289 filed Mar. 8, 1991 (SA9-90-018) "A Method and Means for Ensuring Single Pass Small Read/Write Access to Variable Length Records Stored on Selected DASDS in a DASD Array".

*Primary Examiner*—Robert B. Harrell
*Attorney, Agent, or Firm*—R. Bruce Brodie

[57] ABSTRACT

Variable length records can be accessed from an array of N+2 synchronous fixed block formatted DASDs in a single pass and in the presence of a single DASD failure if each record is partitioned into a variable number of K fixed length blocks, the blocks are written on the DASDs in column major order K modulo (N+1), the order is constrained such that the first block of each record resides on the (N+1)st DASD, a parity block for each column resides on an (N+2)nd DASD, and each parity block spans N blocks in the same column from the first N DASDs and one block one column offset thereto on the (N+1)st DASD.

10 Claims, 2 Drawing Sheets

SYNCHRONOUS DASD ARRAY
Fig. 1

VARIABLE LENGTH
RECORDS (CKD) LAID OUT IN COLUMN MAJOR (VERTICAL ORDER) ON AN ARRAY OF SYNCHRONOUS FIXED BLOCK FORMATTED DASD'S

FIG. 4

METHOD AND MEANS FOR EXECUTION OF COMMANDS ACCESSING VARIABLE LENGTH RECORDS STORED ON FIXED BLOCK FORMATTED DASDS OF AN N+2 DASD SYNCHRONOUS ARRAY

FIELD OF THE INVENTION

This invention relates to an improvement in CPU accessing of variable length records to and from fixed block formatted direct access storage devices (DASDs), and more particularly, to and from an array of N+2 synchronous ones of said DASDs.

DESCRIPTION OF RELATED ART

DASD devices have been formatted to accommodate storing either variable length or fixed length records along their circular track extents. One persistent goal has been that of minimizing the time required to access such DASD stored records. In turn, this means minimizing the time taken to radially position a read/write head over a DASD track and track extent at the start of a record, and, minimizing the number of rotations required to stream records to or from the device. Always, it is necessary to readjust the system state (perform the necessary bookkeeping) with each access.

In the prior art discussed below, Bowers describes track to track mapping of variable length records from a less dense to a more dense DASD recording medium (also termed ONTO mapping). The first Menon copending application U.S. Ser. No. 07/197,057, filed May 20, 1988 (SA9-87-036) maps variable length records as a virtual track overlay onto fixed block formatted tracks. The second Menon copending application U.S. Ser. No. 07/666,289, filed Mar. 8, 1991 (SA9-90-018) performs write updates of variable length records in row major order (DASD track direction) among elements of an N DASD array in a shortened interval.

Variable Length Records on DASD

A significant fraction of data reposes on DASD storage in variable length format. One regimen, which is used on IBM S/370 CPU's and attached external storage, is known as Count/Key/Data or CKD operating under the well known MVS operating system. In this regimen, each record consists of fixed length count field, an optional key field, and a variable length data field. The count field defines the length of the data field while the key field serves to identify the record.

Each of the fields, as recorded on DASD tracks, are spaced apart along a track by a gap of predetermined fixed size. This gap, as it rotates under a read/write head at a constant speed, defines a time interval during which the system prepares to handle the next field.

A record having a data field spanning more than one physical DASD track extent is reformatted at the CPU into several smaller records with appropriate pointers or other linking conventions maintained in the storage or file management portions of the operating system. Likewise, a track may store many small records of various lengths. It follows that more processing is required to read, write, and update variable length records on DASD than records having only fixed extents.

In this specification, the terms "sector" and "track extent" are synonymous. When used in the context of an array of DASDs, the terms are synonymous with the term "column".

Bowers et al, U.S. Pat. No. 4,223,390, "Attaching Magnetic Storage Devices Having Dissimilar Track Capacities and Recording Formats", issued Sep. 16, 1980, describes the mapping of variable length formatted (CKD) records from a full DASD track of lesser recording density onto a partial DASD track of greater recording density. Bowers uses an elaboration of counters and offsets in order to ensure one to one field, gap, and end of track correspondence and recording. This results from the difference in track lengths occupied by the same elements on the different density tracks. This is ONTO mapping in the sense that all of the elements of one set are a proper subset of the second set.

Variable Length Records on Fixed Block Formatted DASDs

The copending Menon et al application, "Emulating One Record Format on Another Record Format", U.S. Ser. No. 07/197,057, filed May 20, 1988 (Applicants' ref. no. SA9-87-036) relates to a method for partial track mapping of CKD variable length records onto fixed block formatted DASD tracks. The method steps include (a) blocking and recording of CKD records on the DASD using embedded pointers while preserving record field and gap order and recording extents, and (b) staging the blocked records defined between pointers in response to access commands.

The blocking step calls for (1) inserting a pointer at the beginning of each block to the first count field of any CKD record, if present. Gap information is encoded by the pointer to the count field as the start of record. Likewise, the count field points to counterpart key and data fields. The blocking step further calls for (2) inserting a pointer in the count field of the last CKD record indicating the end of the logical CKD track.

The last step of the Menon et al method is responsive to CKD address information from a CPU generated read command. This step involves staging the block from the fixed block formatted DASD by way of accessing the block number counterpart to the CKD address and the path defined by the recorded pointers within said block until record end.

Variable Length Records on An Array of N DASDs

Menon, U.S. Pat. No. 5,257,362, "METHOD AND MEANS FOR ENSURING SINGLE PASS SMALL READ/WRITE ACCESS TO VARIABLE LENGTH RECORDS STORED ON SELECTED DASDs IN A DASD ARRAY", filed Mar. 8, 1991, and issued Oct. 26, 1993, shows that write updating of variable length records stored in row major order (DASD track direction) on an array of N DASDs is facilitated by utilizing the correlation between byte offsets of a variable length record and the byte offset of a byte level parity image of data stored on the same track across N−1 other DASDs.

Thus, the write update in a shortened interval is obtained by altering and rewriting the parity concurrent with altering and rewriting the data. That is, both data and relevant parity are accessed in terms of byte offsets in an equivalent virtual DASD. Then, the data and parity are recalculated and rewritten on the selected and Nth DASD respectively.

The parity images are distributed across different DASDs such that there is no "parity DASD" as such. For instance, for an array of N=10 DASDs, the image of the ith track from DASDs 1–9 would be stored on DASD 10 while the image of the ith+1 track over DASDs 2–10 would be stored on DASD 1.

Variable Length Record Mapping on DASDs Requires Elaborate Overhead Processing Significantly, Bowers requires elaborate comparison counting of bytes and byte offsets of fields and gaps laid along a track in order to perform the CKD to CKD ONTO track mapping of records between DASDs. This is caused by the dissimilarity of track recording densities.

While both of the copending Menon applications define variable length records over recording tracks having the same density, an elaboration of byte level counting, displacements, and pointers is still required. In the first case, the elaboration is used to create the "virtual disk track of variable length records" over a single DASD. In the second case, the elaboration defines variable length records in row major order (DASD track direction) over an array of DASDs. This substantially decreases data throughput needed for intensive computing in favor of increased concurrency (at least two different processes may access the array at the same time). It should also be noted, that execution of an update write command requires at least two DASD disk revolutions to completion.

SUMMARY OF THE INVENTION

It is an object of this invention to devise a method and means for minimizing the time required to access variable length records defined over an array of N+2 synchronized fixed block formatted DASDs and to make an efficient use of storage space thereon.

It is another object that such method and means guarantee that the access time to any array record location be no more than that required for a single pass even in the presence of a single DASD failure other than where the DASD containing the start of record has failed.

It is still another object that such method and means guarantee that the access time to any array location be no more than that required for two passes where the DASD containing the start of record has failed.

It is yet again another object that the method and means enhance DASD array use as a fast access, high capacity, intermediate result storage for numerically intensive computations and the like.

In satisfaction of the objects, it was unexpectedly observed that a single pass access to any record on a synchronous DASD array could be assured by:

(1) partitioning records into a string of equal sized blocks and writing the blocks in column major order across the DASDs, (2) recording each start of record (count field) on different track extents of the same DASD in the array, and (3) forming a parity block spanning one block recorded on the prior adjacent track extent on the DASD containing start of record blocks plus N blocks from the current track extent (column) of the N other DASDs.

More particularly, the method and means of this invention include partitioning each variable length record into a variable number of K equal fixed length blocks, and, synchronously writing said blocks in column major order onto the track extents of (N+1) DASDs. The column major order is constrained such that the first block of each record is written along a different track extent on the same track on the (N+1)st DASD.

Next, the method requires forming a simple parity block P(i) along an ith track extent on an (N+2)nd DASD corresponding to each ith track extent on the (N+1) DASDs. P(i) logically combines the block written along the (i−1)st track extent of the (N+1)st DASD and N blocks from the first N other DASDs along their ith track extent.

Lastly, the method in response to each external (READ/WRITE) command, traverses the tracks of the array DASDs in the order defined by the above mentioned steps whereby the blocks forming any record specified in such command and the spanning parity blocks are accessed during a single pass.

In the method of this invention, the column major order is taken K modulo (N+1). Also, the K blocks of any record occupy no more than K/(N+1) contiguous track extents on any one of the (N+1) DASDs. Consecutive extents along the same DASD track are also referred to as the row major order in an array. Lastly, the parity image is formed by exclusive OR (XOR) operation over the designated blocks in the same and offset columns.

The offset reflects the fact that the contents of the block appearing in the current track extent of the (N+1)st DASD are not always determinable by the system for a write operation. In contrast, such determination is always possible for the blocks appearing in the current track extent (column) of DASDs 1 to N.

It is another aspect of this invention to ensure single pass access to variable length records even where the array is subject to an opportunistic failure of a non-start of record containing DASD. This is attained by concurrently XORing (reconstituting) and accessing the blocks on-the-fly using the the blocks from N+1 remaining DASDs.

It is yet another aspect of this invention that upon failure of the DASD containing the start of record, then two pass record access can be achieved for write access while only one pass is needed for a read access. With respect to execution of a write command, the first pass is required to determine the start of record blocks while the second pass executes the access itself.

Unless and until the data from the failed DASD is rewritten onto a formatted spare DASD, the array is said to be operating in degraded mode. When the array operates with an updated spare it is said to be operating in hull tolerant mode. In the absence of sparing, the unavailable data must be recalculated for each access. Also, any additional DASD failure renders the array inoperable.

It is still another aspect that the method and means of this invention results in consecutive byte ordering within each block, consecutive block ordering within each field, and consecutive field ordering within each record.

DESCRIPTION OF THE PREFERRED EMBODIMENT

In this specification, "single pass" means an interval defined by a single period of rotation of a DASD disk. Also, the term "two-pass" means an interval defined by two periods of rotation of a DASD disk.

A Synchronous DASD Array and Its Operation

Figure 1:
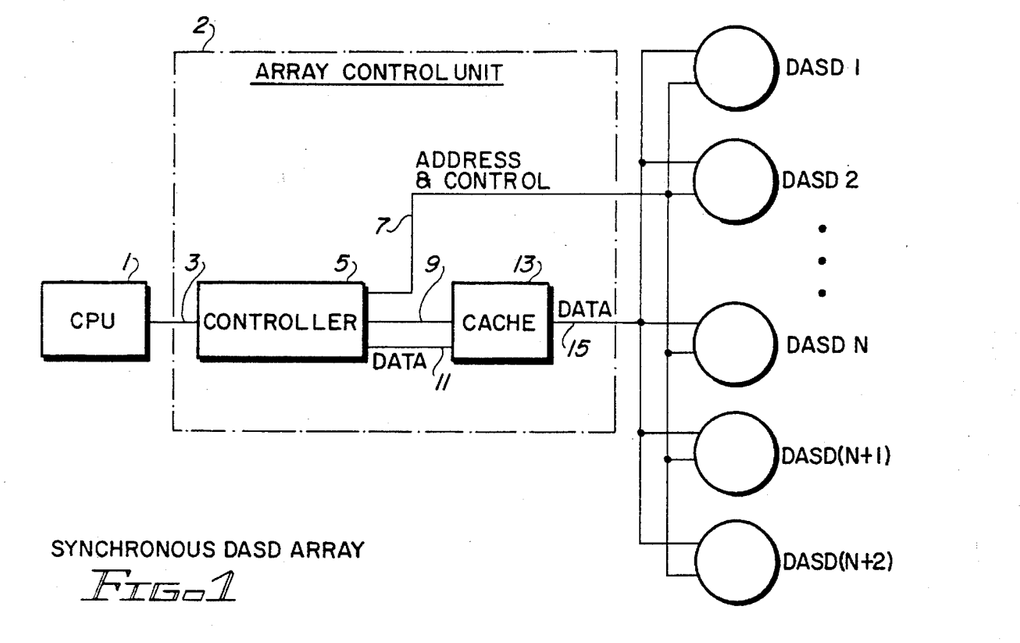
FIG. 1 depicts a synchronous array of N+2 DASDs attached to a CPU by way of an array control unit.

Referring now to FIG. 1, there is shown CPU 1 accessing DASDs 1 through N+2 over a path including channel 3, array controller 5, and cache 13. Controller 5 operatively secures synchronism and accesses among DASD 1 through N+2 over control path 7. Responsive to an access, N+2 streams of data defining a predetermined number of consecutive bytes can be exchanged in parallel to cache 13 over data path 15. Likewise, data can be exchanged serially by byte between CPU 1 and controller 5 over path 3 after a parallel to serial conversion in controller 5 in the read direction and a serial to parallel conversion in the write direction.

In the read direction, data is supplied from cache 13 to controller 5 via data paths 9 and 11. In the write direction, data is moved from the controller 5 to the cache 3 over paths 9 and 11.

N+1 of the blocks represent at least a portion of a variable length record. The (N+2)nd block contains parity information.

As a physical storage system, an array of N+2 DASDs is defined to be any physical arrangement of N+2 DASDs selective ones (or all) of which can be accessed concurrently. Relatedly, the formatting and subsequent read/write accessing of an array, as a logical/physical store proceeds by copying/inserting values in consecutive positions on either a row or a column basis. If the operation is perforated in a column direction, it is designated as being performed in "column major order". Likewise, if performed a row direction, it is designated as being performed in "row major order". Next, the mapping is done from the logical "array" to the physical store (i.e.ganged group of DASDs).

Figure 2:
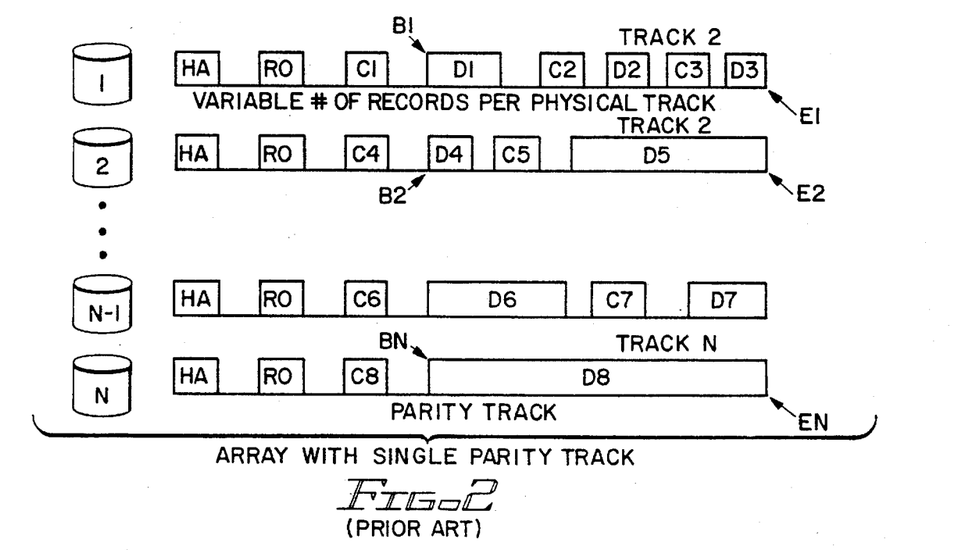
FIG. 2 illustrates the layout of variable length CKD records in row major order (track direction) across an N DASD array according to the prior art.

Referring now to FIG. 2, there is shown a row major or track oriented layout of CKD variable length records according to the copending Menon application. Note, a parity is written onto a dedicated one of the array DASDs.

CPU and Operating System

CPU 1 may be of the IBM S/370 type having an IBM MVS operating system. The S/370 principles of operation are fully described in Amdahl et al, U.S. Pat. No. 3,400, 371, "Data Processing System", issued on Sep. 3, 1968. A configuration involving CPU's sharing access to external storage is set forth in Luiz et al, U.S. Pat. No. 4,207,609, "Path Independent Device Reservation and Reconnection in a Multi-CPU and Shared Device Access System", filed May 8, 1978, issued Jun. 10, 1980.

CKD and ECKD Commands and Architecture

Luiz et al, U.S. Pat. No. 4,207,609, "Method and Means for Path Independent Device Reservation and Reconnection in a Multi-CPU and Shared Device Access System", issued Jun. 10, 1980, and the references cited therein describe CKD commands and their use by a CPU in obtaining variable length records from an attached DASD storage subsystem.

Under this architecture, the CPU creates a dedicated virtual processor for accessing and transferring data streams over demand/response interfaces to attached subsystems using chains of special purpose I/O instructions termed "channel command words" or CCWs. The CCWs are stored in a portion of CPU main memory in support of fast calls. When an application program executes a read or write requiring access to external storage (usually attached DASD storage), then the CPU S/370 operating system initiates such a reference with a START I/O command. This command causes the CPU to suspend its multi-processing state, transfer to the CCW chain, and re-establish its prior state after CCW chain completion.

At least some of the CCW's are sent by the CPU to the external storage subsystem for local interpretation or execution. That is, such CCW's as SEEK and SET SECTOR require the local dispatch of the accessing means to synchronize the movement of data to and from DASDs and the other system components. However, each independent reference or invocation of a CCW chain requires invocation of another START I/O MVS instruction.

Disadvantageously, each START I/O decreases overall CPU throughput because of the overhead cycles expended to save and restore the CPU information state. In this regard, the CKD command set was augmented by several commands to permit the external storage subsystem such as a DASD array to execute a series of operations without requiring a new START I/O.

ECKD is an acronym for Extended Count, Key, Data commands. Reference may be made to "IBM 3990 Storage Control Reference", 2nd edition, Copyright IBM 1988, GA32-0099, chapter 4 entitled "Command Descriptions" between pages 49 and 166 for a detailed architectural descriptions of the DEFINE EXTENT, LOCATE, READ, and WRITE commands. These commands are used in the subsequent description of the method and means of this invention as applied to CKD formatted variable length records.

DEFINE EXTENT and LOCATE Commands

Referring again to FIG. 1, CPU 1 issues DEFINE EXTENT and LOCATE as a pair of sequential commands to array controller 5. The first or DEFINE EXTENT command defines the boundaries or extent of array storage space that subsequent CCW's can access. The second or LOCATE command identifies the operation to be carried out on the data within the permitted space specified by the first command. Additionally, the LOCATE CCW points to the location within the permitted space for executing the operation.

Array controller 5 stores the extent information in the first CCW and compares the extent information with the location mentioned in the second CD. The operation named by the LOCATE CCW is executed upon a comparison match. Otherwise, controller 5 provides an error indication to CPU 1. Thus, multiple operations are permitted without incurring another START I/O.

Column Major Ordering of CKD Records On An Array of N+2 Fixed Block DASDs

Figure 4:
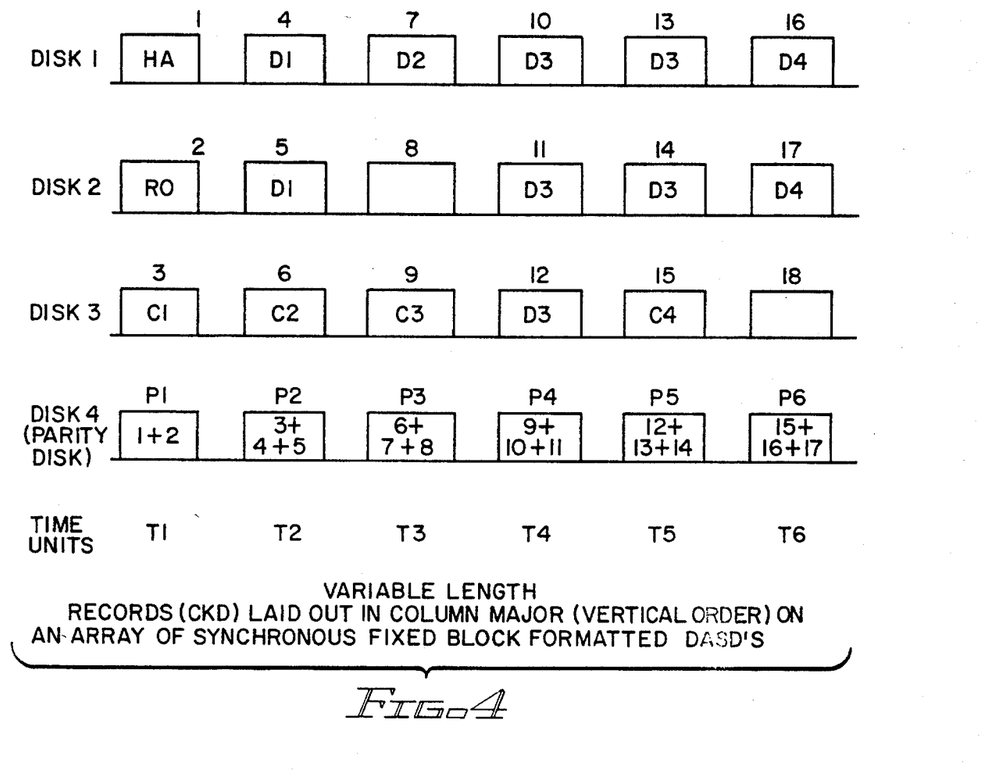
FIG. 4 shows the layout of variable length CKD records onto an array of fixed block formatted DASDs in column major order (vertical track extent direction) according to the invention.

Referring now to FIG. 4, there is shown the storage of variable length CKD formatted records, each one of which has a variable number of K equal sized fixed length blocks, in column major order (vertically) across the DASD array. Each fixed length block typically consists of 512 bytes. In this figure, one track from each of the four DASDs is set out. Illustratively, each DASD track capacity is up to 6 blocks.

The data blocks are consecutively numbered 1 through 18 in column major order. Likewise, the parity blocks designated from P1 through P6. Also, it is assumed that the CKD tracks have no key fields. This assumption merely facilitates discussion. Each track containing CKD records comprises the traditional home address (HA) and and record 0 (R0) fields, followed by four records R1, R2, R3 and R4.

Each record has a count field and a data field. C1 is the count field for R1, C2 for R2, and so on. D1 is the data field for R1, D2 for R2, and so on. It is assumed that D1 is 1 Kbyte, D2 is 512 blocks, D3 is 2.5 Kblocks and D4 is 1 Kblock.

Constraints on Layout and Parity Determination

The constraints are set forth as rules or numbered statements as follows:

1. Number all fixed length block in column major order. Thus, block 1 is on DASD 1, block 2 is on DASD 2, and so on, with block 4 back on DASD 1. Generalized, this states that a variable length record formed from K fixed blocks can be written in column major order K modulo (N+1).

2. Each block can contain data from only one CKD field.

3. All fields are stored block-interleaved, not byte-interleaved. For example, the first 512 blocks of D 1 are stored in block 4, and the second 512 blocks of D1 are stored in block 5.

4. All count fields must be stored in blocks resident on a designated other (N+1)st DASD (DASD 3 in FIG.4). Thus, C1 is in block 3 (from DASD 3), C2 is in block 6 (from DASD 3) and C3 is in block 9 (from DASD 3). Note, D2 ends in block 7 and block 8 is not utilized in order to start C3 in block 9 on DASD 3.

5. Offset the column parity P(i) span to include one block from on e track extent position (column i−1) earlier on the (N+1)st DASD plus N blocks from the current track extent position (column i) of the first N DASDs. Illustratively, P2 contains the parity from blocks 3, 4 and 5, P3 contains the parity from blocks 6, 7 and 8, and so on. Blocks 3, 4 and 5 belong to one parity group, blocks 6, 7 and 8 belong to another parity group, and so on.

In the absence of rule 5, P1 would contain the parity from blocks 1, 2 and 3, P2 would contain the parity from blocks 4, 5 and 6, P3 would contain the parity from blocks 7, 8 and 9, and so on.

One Pass Write of CKD Records Across An N+2 DASD Fixed Block Synchronous Array

Figure 3:
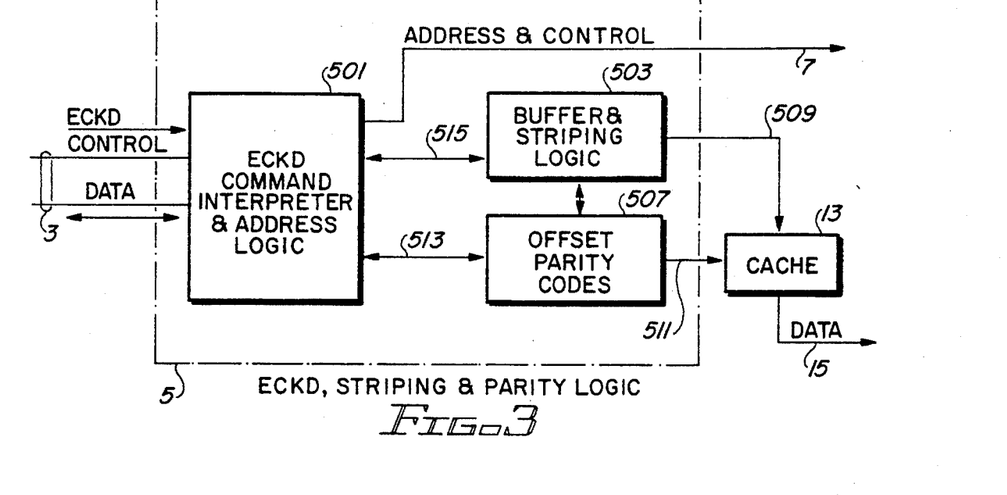
FIG. 3 expands the controller 5 logic of the array control unit shown in FIG. 1.

Referring again to FIG. 4 taken together with FIG. 3, time units corresponding to track extents along a DASD track extent are denominated T1, T2, . . ., T6. Now, consider a request to update D1, which would first require a search on C1. Controller 5 conducts such a search in time unit T1 by reading C1 from block 3 into a buffer (not shown) in logic 501 and compare its value against a host supplied value. On a match, the logic 501 would issue commands to cache 13 over path 515, logic 503, and path 509 and to DASDs 1 and 2 over path 7 to write D1 in time unit T2 into blocks 4 and 5. At the same time, logic 501 would also issue a command to cache 13 over path 513, parity coder 507, and to DASD 4 also over path 7 to write parity in block P2.

The parity in P2 consists of the exclusive OR of blocks 3, 4 and 5. Block 3, containing C1, was read at time T1, and blocks 4 and 5 contain the new values to be written in time T2, and are therefore also available in time. Therefore, all values to be XORed are available, and the parity can be generated in time and written into P2 at time T2. In summary, we do a read to DASD 3 at time T1, and writes to DASDs 1, 2 and 4 in time T2.

Next, consider a write to D2 followed by a write to D3. The operation proceeds as follows. At time T2, read C2 from block 6 on DASD 3. On a match, write D2 on DASD 1 and P3 on DASD 4, and read C3 from DASD 3, all in time unit T3. Match C3, and in time T4, write D3 to DASDs 1, 2 and 3 (blocks 10, 11 and 12), and write P4 to DASD 4. Finally, at time T5, write D3 to DASDs 1 and 2 (blocks 13 and 14), and write P5 to DASD 4.

Array Access In The Presence of DASD Failure

It is the case that one pass writes are still possible even if either DASD 1 or DASD 2 has failed. A second pass will be needed if DASD 3 (which contains the count fields) has failed. Read operations always take one pass - with or without DASD failures. During such read operations, blocks read from DASD 3 will have to be delayed by one block time before being passed to the parity unit, so that blocks from DASDs 1 and 2 that belong to the same parity group may all arrive at the parity unit at the same time as the delayed block from DASD 3.

The space utilization of this method depends on the record lengths of CKD records. Excellent space utilization is possible with standard record lengths like 4K blocks which occur often in practice. With 4K records, the array uses 9 blocks (4.5 Kblocks) to store a CKD record, while a CKD DASD would use 4 Kblocks plus 40 bytes for the count field.

Rebuilding Data After a Failed Data DASD Has been Replaced With a Formatted Spare DASD There are several mechanisms for replacing a failed DASD. These include manual or automatic substitution of the failed DASD by a formatted DASD spare and the rebuilding of the data on the spare. Reference should be made to Dunphy et al U.S. Pat. No. 4,914,656, "Disk Drive Memory", issued Apr. 3, 1990 and to the copending Blaum et al application, U.S. Ser. No. 07/653,596, "Method and Means For Encoding And Rebuilding Data Contents Of Up To Two Unavailable DASDS In An Array 0f DASDS" (SA9-90-055), filed Feb. 11, 1991 for descriptions of so called "hot sparing" in RAID type 3 and RAID type 5 arrays respectively.

Typically, ACU 5 would ascertain that one of the DASDs has failed. The failure criteria is beyond the scope of this invention. Once having determined that a DASD, say DASD 1 is unavailable, the ACU 5 could switchably interconnect the spare in the manner described in Dunphy and then systematically regenerate the data on the spare by XORing the contents of the remaining array DASDs in a single pass.

The key to restoring the array to hull tolerant mode is by writing the spare DASD other than the (N+1)st or (N+2)nd with a one block offset and resynching the indices. The protocol for effectuating this is illustrated in the pseudo-code control flow shown below in Example 5.

Principles of the Invention Illuminated by Channel Programs

As previously mentioned, channel programs are sequences or chains of CCW's some of whose instructions are sent by CPU 1 for execution (technically interpretation) to array controller 5. The CCW chains are designed to simply read or write the "Channel". At the highest level, each CCW sequence consists of the commands DEFINE EXTENT, LOCATE, READ/WRITE, and test for terminating condition otherwise LOOP.

Five sequences are shown. These include read and write channel programs or fault tolerant operation of the array, read and write channel programs for degraded mode array operation, and a redo of data from a failed DASD onto a substitute or spare. Also, each program is described in terms of the array controller and DASD dynamics.

Execution of Channel Programs for Single Pass READ/WRITE Ops According to the Invention In the following examples, a 3+P array is assumed. That is, three DASDs are dedicated to storing data and 1 DASD dedicated to storing parity blocks. Note, that one of the DASDs (FIG. 4 DASD 3) also stores start of record (count fields).

EXAMPLE 1

- START OF READ CHANNEL PROGRAM - FAULT TOLERANT MODE

Define Extent

Locate

Read

1. On receiving Define Extent:

- Validate the command

- Fetch and verify the parameters

- Save the extent information (range of addresses)

2. On receiving Locate

- Validate Command

- Fetch Cylinder and Head to seek to (CC, HH) respectively.

- Validate CC, HH and ensure they are within extent specified before.

- Fetch 5 bytes of search parameters. (CC,HH,R)

- Validate search parameters

- Fetch track extent number (S) parameter

- Validate track extent number

- Round S to nearest multiple of 3 (for 3+P array); say S'

- Let S"=S'/3

- Move all DASDs in array to cyl CC, Head HH, track extent S"

(In Figure 2 example, if S was specified as 8, we would round up to 9, then divide by 3 to get S" as 3. On all DASDs we would move to track extent position 3, which is D2 on DASD 1, zeroes on DASD 2 and C3 on DASD 3).

R: Read count field at this position, track extent S" from DASD 3. Other DASDs do nothing at this track extent position.

- If this is not a count field on DASD 3, increment S" by 1 and in next time unit, repeat the operation of the previous step. If it is a count field, continue to next step.

- Compare count field with search parameters (CC,HH,R) fetched earlier. If not equal, use key and data length parameters in count field to figure out track extent at which next count field will be. Update S" to this track extent position and go back to R:.

If search parameters match, fetch next CCW (Read Data)

- Use data length parameter in count field to figure out X, the number of track extents in the data field.

LOOP:

- If X>= 3, then read from next track extent position on all data DASDs

- If X = 2, then read from next track extent position on DASDs 1 and 2

- If X = 1, then read from next track extent position on DASD 1.

- If X < = 3, then stop. else X=X-3; and return to LOOP:

- END OF READ CHANNEL PROGRAM - FAULT TOLERANT MODE

*****************************************************************

EXAMPLE 2:

- START OF WRITE CHANNEL PROGRAM - FAULT TOLERANT MODE

Define Extent

Locate

Write

1. On receiving Define Extent:

- Validate the command

- Fetch and verify the parameters

- Save the extent information

2. On receiving Locate

- Validate Command

- Fetch Cylinder and Head to seek to (CC, HH) respectively.

- Validate CC, HH and ensure they are within extent specified before.

- Fetch 5 blocks of search parameters.

- Validate search parameters

- Fetch track extent number (S) parameter

- Validate track extent number

- Round S to nearest multiple of 3 (for 3+P array); say S'

- Let S"=S'/3

- Move all DASDs in array to cyl CC, Head HH, track extent S"

(In Figure 2 example, if S was specified as 8, we would round up to 9, then divide by 3 to get S" as 3. On all DASDs we would move to track extent position 3, which is D2 on DASD 1, zeroes on DASD 2 and C3 on DASD 3).

R: Read count field at this position, track extent S" from DASD 3. Other DASDs do nothing at this track extent position.

- If this is not a count field on DASD 3, increment S" by 1 and in next time unit, repeat the operation of the previous step. If it is a count field, continue to next step.

- Compare count field with search parameters fetched earlier. If not equal, use key and data length parameters in count field to figure out track extent at which next count field will be. Update S" to this track extent position and go back to R:.

If search parameters match, fetch next CCW (Write Data)

- Use data length parameter in count field to figure out X, the number of track extents in the data field.

- Current_track extent=S"

LOOP:

- Prev_track extent = S"

- Curr_track extent = Curr_track extent+1

- If X >= 3, then write to curr_track extent position on all data DASDs

- If X = 2, then write to curr_track extent position on DASDs 1 and 2

- If X = 1, then write to curr_track extent position on DASD 1, and zeroes to DASD 2.

- In all cases, write P to parity DASD at curr_track extent, where P is (prev_track extent on DASD 3) XOR (curr_track extent on DASD 1) XOR (curr_track extent on DEVICE 2)

- If X <= 3, then stop. else X=X-3; and return to LOOP:

- END OF WRITE CHANNEL PROGRAM - FAULT TOLERANT MODE.

Channel Program Execution in Degraded Mode:

Assume DASD 1 has failed

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

EXAMPLE 3

- START OF READ CHANNEL PROGRAM - DEGRADED MODE

Define Extent

Locate

Read

1. On receiving Define Extent:

- Validate the command

- Fetch and verify the parameters

- Save the extent information

2. On receiving Locate

- Validate Command

- Fetch Cylinder and Head to seek to (CC, HH) respectively.

- Validate CC, HH and ensure they are within extent specified before.

- Fetch 5 blocks of search parameters.

- Validate search parameters

- Fetch track extent number (S) parameter

- Validate track extent number

- Round S to nearest multiple of 3 (for 3+P array); say S'

- Let S"=S'/3

- Move all DASDs (except failed DASD) in array to cyl CC, Head HH, track extent S".

(In Figure 4 example, if S was specified as 8, one would round up to 9, then divide by 3 to get S" as 3. On all DASDs one would move to track extent position 3, which is D2 on DASD 1, zeroes on DASD 2, C3 on DASD 3, and P3 on DASD 4 (the parity DASD)).

R: Read count field at this position, track extent S" from DASD

3. Other DASDs do nothing at this track extent position.

- If this is not a count field on DASD 3, increment S" by 1 and in next time unit, repeat the operation of the previous step. If it is a count field, continue to next step.

- Compare count field with search parameters fetched earlier.

If not equal, use key and data length parameters in count field to figure out track extent at which next count field will be. Update S" to this track extent position and go back to R:

If search parameters match, fetch next CCW (Read Data)

- Use data length parameter in count field to figure out X, the number of track extents in the data field.

- Current_track extent=S"

LOOP:

- Prev_track extent = S"

- Curr_track extent = Curr_track extent+1

- If X>= 3, then read from curr_track extent on all DASDs.

Since DASD 1 is broken, calculate curr_track extent on DASD 1 on-the-fly as (prev_track extent on DASD 3) XOR (curr_track extent on DASD 2) XOR (curr_track extent on DASD 4)

prev_track extent on DASD 3 is now available , and curr_track extent on DASDs 2 and 4 can be read. Also, curr_track extent on DASD 3 should be read , since this will become prev_track extent on next iteration of loop, when prev_track extent on DASD 3 may be needed.

- if X = 2, then return curr_track extent from DASDs 1 and 2 to CPU 1 host as part of the read. Curr_track extent from DASD 2 is directly read and returned to CPU.

Curr_track extent from DASD 1 is calculated on the fly as (prev_track extent on dev. 3) XOR (curr_track extent on dev. 2) XOR (curr_track extent on DASD 4)

prev_track extent already located on DASD 3, and curr_track extent can be read from DASDs 2 and 4. Also, curr_track extent should also be read from DASD 3, since this will become prev_track extent on next iteration of LOOP, when prev_track extent on DASD 3 may be needed.

- if X = 1, then it is necessary to return curr_sector from DASD 1 to CPU 1. Since DASD 1 is broken, curr_track extent from DASD 1 is calculated on-the-fly as (prev_track extent on DASD 3) XOR (curr_track extent on DASD 2) XOR (curr_track extent on DASD 4)

prev_track extent on DASD 3 is already available, and curr_track extent can be read from on DASDs 2 and 4. curr_track extent should also be read fromn DASD 3, since this will become prev_track extent on next iteration of loop, when prev_track extent on DASD 3 will be needed.

- If X<=3, then stop. else X=X-3; and return to LOOP:

- END OF READ CHANNEL PROGRAM - DEGRADED MODE

*************************************************************

EXAMPLE 4:

- START OF WRITE CHANNEL PROGRAM - DEGRADED MODE

Define Extent

Locate

Write

1. On receiving Define Extent:

- Validate the command

- Fetch and verify the parameters

- Save the extent information

2. On receiving Locate

- Validate Command

- Fetch Cylinder and Head to seek to (CC, HH) respectively.

- Validate CC, HH and ensure they are within extent specified before.

- Fetch 5 bytes of search parameters.

- Validate search parameters

- Fetch track extent number (S) parameter

- Validate track extent number

- Round S to nearest multiple of 3 (for 3+P array); say S'

- Let S"=S'/3

- Move all DASDs in array (except broken DASD)

to cyl CC, Head HH, track extent S"

(In Figure 4 example, if S was specified as 8, one would round up to 9, then divide by 3 to get S" as 3. On all DASDs, one would move to track extent position 3, which is D2 on DASD 1, zeroes on DASD 2, C3 on DASD 3 and P3 on DASD 4 (the parity DASD)).

R: Read count field at this position, track extent S" from DASD 3.

Other DASDs do nothing at this track extent position.

- If this is not a count field on DASD 3, increment S" by 1
and in next time unit, repeat the operation of the previous
step. If it is a count field, continue to next step.

- Compare count field with search parameters fetched earlier.
If not equal, use key and data length parameters in count
field to figure out track extent at which next count field
will be. Update S" to this track extent position and go back
to R:.

If search parameters match, fetch next CCW (Write Data) - Use
data length parameter in count field to figure out X, the
number of track extents in the data field.

- Current_track extent=S"

LOOP:

- Prev_track extent = S"

- Curr_track extent = Curr_track extent+1

- If X>= 3, then write to curr_track extent position on all
DASDs except DASD 1

- if X = 2, then write to curr_track extent position on DASDs 2
and 4, and read from curr_track extent on DASD 3. Curr_track
extent on DASD 3 is read, because, in the next iteration, it
will become prev_track extent, and prev_track extent on DASD
3 is needed to generate parity.

- if X = 1, then write to DASD 2 (zeroes) and DASD 4. Read from
curr_track extent on DASD 3. Curr_track extent on DASD 3 is
read, because, in the next iteration, it will become
prev_track extent, and prev_track extent on DASD 3 is needed to generate parity.

- In all cases, write P to parity DASD at curr_track extent, where P is (prev_track extent on DASD 3) XOR (curr_track extent on DASD 1)

XOR (curr_track extent on dev 2) Curr_track extent on DASD 1 in above formula is obtained from the host as part of the Write data and is not read from DASD. Prev_track extent on DASD 3 was read at the previous sector position.

- If X<=3, then stop. else X=X-3; and return to LOOP:

- END OF WRITE CHANNEL PROGRAM - DEGRADED MODE

- At the end of write, no data has been written to DASD 1, but data has been written to all other data DASDs and the parity DASD, so that when the failed DASD is replaced, all the missing data can be recalculated and stored on the replaced DASD.

***********************************************************

EXAMPLE: 5

METHOD FOR REBUILDING DATA AFTER FAILED DASD 1 HAS BEEN REPLACED WITH A FORMATTED SPARE DASD:

- C = # of cylinders on DASD

- T = # of tracks per cylinder

- B = # of track extents per track

- Attach formatted spare DASD to array controller and align the track indices offset by one track extent from the indices of the other array DASDs Do from i = 1 to C;

Move to cylinder i on all DASDs

Do from j = 1 to T

Move to track j on all DASDS

Do from k = 1 to B

Generate track extent k to be stored on spare DASD in time unit k value of track extent k on DASD 1 (spare DASD) is generated as (track extent k on DASD 2) XOR (track extent k on DASD 4) XOR (track extent k-1 on DASD 3)

when k>=2;

value of track extent k on DASD 1 is generated as (track extent k on DASD 2) XOR (track extent k on DASD 4) XOR (track extent B on DASD 3)

when k=1;

store the generated track extent k on the spare DASD at time unit k+1 end do on k;

end do on j;

end do on i;

resynchronise track indices of spare DASD with the track indices of the remaining array DASDs

ENTER FAULT TOLERANT MODE

*******************************************************

Extensions

These and other extensions of the invention may be made without departing from the spirit and scope thereof as recited in the appended claims.

I claim:

1. A method for accessing variable length records defined over an array of (N+2) synchronized, fixed block formatted, cyclic, multi-tracked direct access storage devices DASDs e.g. DASD1—DASD(N+2)) responsive to a series of access commands (CCW's) generated by a CPU (1) and interpreted by a control unit (2) intercoupling the CPU and the array, said control unit including access command interpreter means (501), buffer and striping logic (503), parity coding means (507), and access means (7, 9, 11, 13, 15), said buffer and striping logic partitioning each record into fixed length blocks, said parity means computing parity over a predetermined number of blocks, and said access means synchronously reading or writing the predetermined number of blocks and associated parity from or to counterpart array DASD locations, each partitioned record having at least a first block, wherein the method comprising the steps of:

(a) partitioning each variable length record into a variable number K fixed length blocks by said buffer and striping logic, and, synchronously writing said blocks in column major order K modulo (N+1) across counterpart track extents on each of said (N+1) DASDs by said access means (FIG. 4, disks 1–3), said column major order being constrained such that the first block of each record is written along a different track extent on the (N+1) st DASD (FIG. 4, disk 3);

(b) forming and writing a parity block P(i) concurrently with step (a) along an ith track extent on an (N+2)nd DASD (FIG. 4, disk 4) corresponding to an ith track extent on each of said (N+1) DASDs by said parity coding means, P(i) logically combining the block written along an (i-1)st track extent of the (N+1)st DASD (FIG. 4, block 3) and N blocks from the first N other DASDs (FIG. 4, blocks 4–6) along their ith track extents; and (c) responsive to each access (READ/WRITE) command, traversing the track extents of the array DASDs by said access means in the order defined by steps (a) and (b), whereby the blocks forming any record specified in such command and spanning parity blocks can be accessed during a single pass, a single pass being one cycle of rotational revolution of a fixed point on any DASD track extent during which a transfer of a record or portion thereof from or to the DASDs of the array is effectuated, a track extent being a circumferential distance collinear with a track.

2. The method according to claim 1, wherein the K blocks of any record occupy no more than K/(N+1) contiguous track extents on any one of the first (N+1) DASDs.

3. The method according to claim 1, wherein the logical combining referenced in step (b) includes that of performing an exclusive OR operation over N+1 blocks.

4. A method for ensuring single pass synchronous access to variable length records across ones of a fixed block formatted, cyclic, multitracked direct access storage device (DASD) array over a common path responsive to a series of access commands (CCW's) generated by a CPU (1) and interpreted by a control unit (2) intercoupling the CPU and the array, said control unit including access command interpreter means (501), buffer and striping logic (503), parity coding means (507), and access means (7, 9, 11, 13, 15), said buffer and striping logic partitioning each record into fixed length blocks, said parity means computing parity over a predetermined number of blocks, and said access means synchronously writing the predetermined number of blocks and associated parity to counterpart array DASD locations, each record including a fixed length count field and a variable length data field, comprising the steps of:

(a) reformatting each record into a first block representing the count field and a variable number of other blocks representing the data field by said buffer and striping logic, and, synchronously writing the blocks of each reformatted record in column major order K modulo (N+1) over N+1 DASDs said access means (FIG.4, disks 1–3), said column major order being constrained such that all first blocks inclusive of the count field are recorded on the (N+1)st DASD (FIG. 4, disk 3);

(b) forming and writing a parity block for each counterpart column order concurrent with step (a) on an (N+2)nd DASD by said parity coding means (FIG. 4, disk 4), each parity block spanning N blocks in the same column from the first N DASDs (FIG. 4, blocks 4–6) and one block one column offset thereto on the (N+1)st DASD (FIG. 4, block 3); and (c) responsive to each command requesting at least one record, accessing the blocks forming the requested record and the correlated parity blocks in the order defined by steps (a) and (b) by said access means thereby ensuring access of the requested record and its parity image in a single pass, a single pass being one cycle of rotational revolution of a fixed point on any DASD track extent during which a transfer of a record or portion thereof from or to the DASDs of the array is effectuated, a track extent being a circumferential distance collinear with a track.

5. The method according to claim 4, wherein the parity block is formed by XORing of the spanned blocks.

6. A method for ensuring single pass synchronous access to variable length records across ones of a fixed block formatted, cyclic, multi-tracked direct access storage device (DASD) array over a common path responsive to a series of access commands (CCW's) generated by a CPU (1) and interpreted by a control unit (2) intercoupling the CPU and the array, said control unit including access command interpreter means (501), buffer and striping logic (503), parity coding means (507), and access means (7, 9, 11, 13, 15), said buffer and striping logic partitioning each record into fixed length blocks, said parity means computing parity over a predetermined number of blocks, and said access means synchronously writing the predetermined number of blocks and associated parity to counterpart array DASD locations, each counterpart track on each array DASD including an indexed reference point, each record including at least a fixed length count field and a variable length data field, said array being opportunistically subject to a constitutive DASD failure, comprising the steps of:

(a) reformatting each record into a first block representing the count field and a variable number of other blocks representing the data field by said buffer and striping logic, and, synchronously writing the blocks of each reformatted record in column major order K modulo (N+1) over N+1 DASDs by said access means (FIG.4, disks 1–3), said column major order being constrained such that all first blocks are recorded on the (N+1)st DASD (FIG. 4, disk 3);

(b) forming and writing a parity block for each counterpart column order concurrent with step (a) on an (N+2)nd DASD by said parity coding means (FIG. 4, disk 4), each parity block spanning N blocks in the same column from the first N DASDs (FIG. 4, blocks 4–6) and one block one column offset thereto on the (N+1) st DASD (FIG. 4, block 3); and (c) responsive to an opportunistic DASD failure other than the (N+1)st and (N+2)nd DASDs and a command requesting at least one record, recovering each unavailable block from the correlated parity block and the remaining blocks spanned by the parity block and concurrently accessing the blocks of the requested record including any recovered blocks in the column major order defined by steps (a) and (b), a single pass being one cycle of rotational revolution of a fixed point on any DASD track extent during which a transfer of a record or portion thereof from or to the DASDs of the array is effectuated, a track extent being a circumferential distance collinear with a track.

7. The method according to claim 6, jointly responsive to an opportunistic failure of the (N+1)st DASD and a command requesting at least one record, said command being selected from the set consisting of the read, write, and write update commands, the method further comprising the steps of:

(d) recovering the first blocks of each record from the correlated parity block and the remaining blocks spanned by the parity block during a first pass; and (e) during execution of any write update command, accessing the blocks of the requested record including any recovered blocks in the column major order defined by steps (a) and (b) during a second pass.

8. The method according to claims 6 or 7, wherein the recovering of unavailable blocks includes the XORing of the correlated parity block and the remaining blocks spanned by the parity block.

9. The method according to claim 6, wherein at least one of the DASDs of the array is reserved, whereupon, if any of the DASDs other than the spare, the (N+1)st, and the (N+2)nd is rendered unavailable for record accessing, the method further comprises the steps of:

(f) replacing the unavailable DASD by the reserved DASD; and in a single pass (g) recovering each unavailable block by XORing each correlated parity block and the remaining available blocks spanned by the parity block; and (h) writing each recovered block to the spare DASD with a one block offset, and resynching the indices of the array DASDs.

10. In an external storage subsystem comprising a plurality fixed block formatted cyclic multitracked storage devices (DASDs), an array control unit (ACU) responsive to external commands for synchronously accessing said DABDs and for transferring one or more variable length records between said DASDs and a CPU coupled thereto, wherein the improvement in the ACU comprises:

(a) means (3, 501, 503) responsive to an external write command for partitioning a variable length record into variable number of K consecutive fixed length blocks;

(b) means (7, 13, 15) for writing said blocks in column major order over N+1 DASDs in which the first block of each record is written on the (N+1)st DASD;

(c) means (507, 511, 513) for forming and writing a parity block for each counterpart column order concurrent with step (a) on an (N+2)nd DASD, each parity block spanning N blocks in the same column from the first N DASDs and one block one column offset thereto on the (N+l)st DASD; and (d) means (501, 7, 503, 507) responsive to each external command requesting at least one record, accessing the blocks forming the requested record and the correlated parity blocks in the order defined by means (a)–(c), thereby ensuring access of the requested record and its parity image in a single pass, a single pass being one cycle of rotational revolution of a fixed point on any DASD track extent during which a transfer of a record or portion thereof from or to the DABDs of the array is effectuated, a track extent being a circumferential distance collinear with a track.

* * * * *